3,832,206
Patented Aug. 27, 1974

3,832,206
PREPARATION OF A COMPOSITE PIGMENT
CONTAINING TiO₂ AND CaCO₃
John J. Libera, Afton, and Charles R. Trampier, Jr., Webster Groves, Mo., assignors to NL Industries, Inc., New York, N.Y.
No Drawing. Filed Sept. 12, 1972, Ser. No. 288,391
Int. Cl. C09c 1/36
U.S. Cl. 106—300    2 Claims

ABSTRACT OF THE DISCLOSURE

A new composition of matter comprising a coalesced composite pigment containing from 50% to 80% titanium dioxide, the remainder being calcium carbonate, said coalesced composite pigment having an alkaline pH above 8.0.

BACKGROUND OF THE INVENTION

Many prior art composite pigments have been described in the art. Among those described are titanium dioxide composite pigments which contain either calcium sulfate or calcium carbonate. The instant invention is concerned in preparing titanium dioxide composite pigment in which the extender is calcium carbonate. Many prior art processes have been described in the art which produce this type of composite pigment.

One method described in the art is U.S. Pat. No. 2,170,800 in which a composite pigment of titanium dioxide and calcium sulfate is reacted with an aqueous carbonate solution to convert the calcium sulfate to calcium carbonate in the composite pigment.

Another method for producing the titanium dioxide-calcium carbonate composite pigment is described in U.S. Pat. No. 3,528,838 in which a solution of sodium carbonate and a solution of calcium chloride are prepared. The TiO₂ pigment is dispersed in one of these solutions and the two solutions are mixed to precipitate the titanium dioxide-calcium carbonate composite pigment.

Although these composite pigments have been used in the prior art, it has been found that improved optical results may be obtained when the titanium dioxide-calcium carbonate composite pigment is prepared by the instant invention.

SUMMARY OF THE INVENTION

An improved coalesced composite pigment having an alkaline pH and containing from 50% to 80% titanium dioxide, the remainder being calcium carbonate, has been prepared.

This new product is prepared by the instant process which comprises forming an aqueous solution of sodium carbonate, adding to said sodium carbonate solution, TiO₂ pigment particles, separately preparing a hydrated lime aqueous slurry, adding said hydrated lime aqueous slurry to the TiO₂ slurry of aqueous sodium carbonate to react with the sodium carbonate, said calcium carbonate formed in the presence of said TiO₂ pigment particles, thus forming a coalesced composite pigment, the entire process carried out at a pH above 8.0.

An alternative process is to add the titanium dioxide pigment particles to the lime slurry and then admix the lime-titanium dioxide slurry and the sodium carbonate solution to form said composite pigment of titanium dioxide and calcium carbonate.

DESCRIPTION OF THE PREFERRED EMBODIMENTS

In carrying out the process of the instant invention, a titanium dioxide pigment having the crystalline structure of anatase is used. The titanium dioxide pigment material should have an average particle size of about 0.2 to 0.4 micron.

A sodium carbonate solution containing from 100 g.p.l. to 250 g.p.l. sodium carbonate is prepared. An aqueous slurry of lime is prepared which contains from 50 g.p.l. to 225 g.p.l. calcium hydroxide.

The titanium dioxide pigment is then added to either the sodium carbonate solution or to the aqueous lime slurry and the solution and the slurry are admixed to form the desired composite pigment. Since the calcium carbonate is formed in the presence of the titanium dioxide particles a coalesced composite pigment is obtained.

The amount of titanium dioxide pigment employed is sufficient to produce a product containing from 50% to 80% titanium dioxide in the final composite pigment.

Although the titanium dioxide pigment may be added either to the sodium carbonate solution or the hydrated lime slurry, it is preferred to add the titanium dioxide pigment to the sodium carbonate solution. Using this procedure the aqueous slurry of lime should preferably contain from 100 g.p.l. to 225 g.p.l. calcium hydroxide and this slurry should be added to the sodium carbonate-titanium dioxide slurry over a period of from 15 to 60 minutes. After the addition the mixture should be held for 15 to 60 minutes before filtering. The amount of lime added to the sodium carbonate-titanium dioxide slurry should be substantially the theoretical amount to react with the sodium carbonate to form calcium carbonate in the final product. The sodium hydroxide formed is removed from the product by washing.

If the titanium dioxide pigment is added to the lime slurry instead of the sodium carbonate solution, the lime slurry should contain from 50 g.p.l. to 125 g.p.l. calcium hydroxide.

It should be noted that when either method is employed, the entire process is carried out at an alkaline pH, i.e. above 8.0 in contrast to the prior art processes which are carried out at an average pH of 7.0 or below.

The following test procedures were used to determine the various properties of the product obtained.

The oil absorption was determined by the standard ASTM D281–31 test.

The tinting strength was determined by the standard Reynolds tinting strength test.

The contrast ratio was determined by measuring the green reflectance on a Colormaster of the coated paper sheet and compared to the standard white plaque which has an opacity of 100%.

In order to describe the instant invention more fully, the following examples are presented:

Example 1

908 g. of sodium carbonate were added to water to produce a solution containing 155 g.p.l. sodium carbonate. To this solution with agitation were added 2050 g. of titanium dioxide pigment.

An aqueous lime slurry was prepared by adding 635 g. of Ca(OH)₂ to 2000 ml. of water.

This lime slurry was then added to the sodium carbonate-titanium dioxide slurry over a period of 30 minutes with stirring. After the lime slurry was added to the sodium carbonate-titanium dioxide slurry, the mixture was agitated for 30 minutes. All of these operations were carried out at room temperature.

After agitating for 30 minutes, the newly formed calcium carbonate which was coalesced with the titanium dioxide pigment was then separated by filtration. The sodium hydroxide formed was removed by filtering and washing.

The coalesced titanium dioxide-calcium carbonate composite pigment was dried and milled. The final composite product had a pH of 9.7. It was analyzed and found to contain 69.7% $TiO_2$ and 3.7% free and bound water (total loss on ignition at 600° C.). Its oil absorption was 34.6. The tinting strength was 1090.

Electron micrographs showed that the coalesced composite pigment consisted of an intimate mixture with the $TiO_2$ and calcium carbonate particles in close contact, thus defining it as a true composite pigment.

Example 2

In this example the titanium dioxide pigment was added to the lime slurry instead of the sodium carbonate solution.

2050 g. of $TiO_2$ in an aqueous slurry containing 37% solids were added to a lime slurry containing 168 g.p.l. calcium hydroxide. This $TiO_2$ lime-slurry was added to the sodium carbonate solution over a period of 30 minutes with agitation. The newly formed coalesced titanium dioxide-calcium carbonate composite pigment was agitated for 30 minutes then removed from the solution by filtration and washing to remove the sodium hydroxide formed.

The composite pigment formed was then dried and milled. The dried product was then tested to determine its properties. It was found that similar results were obtained to those produced in Example 1. The results are recorded in the following table along with those of Example 1.

Example 3

For comparative purposes, in this example the composite pigment was prepared in a manner similar to that described in U.S. Pat. No. 3,528,838.

908 g. of sodium carbonate were dissolved in water to form a solution having 162 g.p.l. sodium carbonate. 950 g. of titanium dioxide pigment were added to the solution.

A solution containing 410 g.p.l. calcium chloride was added to the sodium carbonate titanium dioxide slurry over a period of 2 minutes and a gel-like precipitate was immediately formed. After all of the calcium chloride solution was added, the mixture was filtered and the sodium chloride was removed by filtering and washing. The final product had a pH of 7.0.

This product when dried and milled was analyzed and the results are recorded in the following table.

It should be noted that the products prepared by the instant invention as shown in Examples 1 and 2 are superior in hiding power and optical properties to that produced by Example 3 which is a prior art method.

While this invention has been described and illustrated by the examples shown, it is not intended to be strictly limited thereto, and other variations and modifications may be employed within the scope of the following claims.

TABLE

|  | Examples | | |
| --- | --- | --- | --- |
|  | 1 | 2 | 3 |
| Oil absorption | 34.6 | 28.0 | 23.4 |
| Tinting strength | 1,090 | 1,025 | 730 |
| $TiO_2$, percent | 69.7 | 69.8 | 51.5 |
| Tinting strength/percent $TiO_2$ | ª 15.7 | ª 14.7 | ª 14.2 |
| Opacity (contrast ratio, percent) | 92.0 | 91.8 | 91.4 |

ª Points/percent.

We claim:

1. A method for forming a coalesced composite pigment containing titanium dioxide and calcium carbonate having an alkaline pH above 8.0 which comprises forming a sodium carbonate solution; said solution having a concentration from 100 to 250 g.p.l. sodium carbonate, adding to said sodium carbonate solution, titanium dioxide pigment to form a slurry, separately preparing a lime slurry; said lime slurry having a concentration from 100 to 225 g.p.l. calcium hydroxide; said sodium carbonate and said lime being present in substantially the theoretical amount to form calcium carbonate; admixing said lime slurry with said sodium carbonate-titanium dioxide slurry to form a coalesced titanium dioxide-calcium carbonate composite pigment composition and sodium hydroxide and removing said sodium hydroxide from said coalesced composite pigment by filtration and washing, the pH of the said mixture being held at a pH above 8.0 during the entire process, and then drying and milling said coalesced composite pigment.

2. A method for forming a coalesced composite pigment containing titanium dioxide and calcium carbonate having an alkaline pH above 8.0 which comprises forming a sodium carbonate solution; said solution having a concentration from 100 to 250 g.p.l. sodium carbonate, separately preparing a lime slurry; said lime slurry having a concentration from 50 to 125 g.p.l. calcium hydroxide; said sodium carbonate solution and said lime slurry being present in substantially the theoretical amount to form calcium carbonate, adding to said lime slurry titanium dioxide pigment, admixing said lime-titanium dioxide pigment slurry with said sodium carbonate solution to form a coalesced titanium dioxide-calcium carbonate composite pigment composition and sodium hydroxide, removing said sodium hydroxide from said coalesced composite pigment by filtration and washing, the pH of said mixture being held at a pH above 8.0 during the entire process, and then drying and milling said coalesced composite pigment.

References Cited

UNITED STATES PATENTS

| 3,528,838 | 9/1970 | Brixner | 106—300 |
| 2,140,375 | 12/1938 | Allen et al. | 106—306 |
| 3,337,359 | 8/1967 | Bauman | 106—306 |

DELBERT E. GANTZ, Primary Examiner

J. V. HOWARD, Assistant Examiner

U.S. Cl. X.R.

106—306, 308 B

UNITED STATES PATENT OFFICE
CERTIFICATE OF CORRECTION

Patent No. 3,832,206          Dated August 27, 1974

Inventor(s) John J. Libera and Charles R. Trampier, Jr.

It is certified that error appears in the above-identified patent and that said Letters Patent are hereby corrected as shown below:

Change the heading of the Patent to read:

John J. Libera, Afton, and Charles R. Trampier, Jr., Webster Groves, Mo., said Libera assignor to NL Industries, Inc., New York, N.Y.

Signed and sealed this 3rd day of December 1974.

(SEAL)
Attest:

McCOY M. GIBSON JR.
Attesting Officer

C. MARSHALL DANN
Commissioner of Patents